United States Patent [19]

Kashiwagi

[11] Patent Number: 4,924,411

[45] Date of Patent: May 8, 1990

[54] DOCUMENT PROCESSING APPARATUS HAVING SHADING PROCESS FUNCTION

[75] Inventor: Teiichi Kashiwagi, Hiratsuka, Japan

[73] Assignee: Hitachi, Ltd., Tokyo, Japan

[21] Appl. No.: 140,789

[22] Filed: Jan. 5, 1988

[30] Foreign Application Priority Data

Jan. 12, 1987 [JP] Japan .................................. 62-4438

[51] Int. Cl.$^5$ ............................................... G06F 3/14
[52] U.S. Cl. ..................................... 364/518; 340/750
[58] Field of Search ... 364/200 MS File, 900 MS File, 364/521, 578; 340/734, 750

[56] References Cited

U.S. PATENT DOCUMENTS

| | | | |
|---|---|---|---|
| 4,539,653 | 9/1985 | Bartlett et al. | 364/900 |
| 4,648,047 | 3/1987 | Berkland et al. | 364/519 |
| 4,649,513 | 3/1987 | Martin et al. | 364/900 |

OTHER PUBLICATIONS

"IBM Writing Assistant," International Business Machines Corporation, 1984, pp. 6-21 to 6-25.

Primary Examiner—David L. Clark
Attorney, Agent, or Firm—Antonelli, Terry & Wands

[57] ABSTRACT

In entering a text in a document processing apparatus such as a word processor, an operator directs the document processing apparatus to implement a shading process for an intended portion in the text. In response to the operator's instruction, shading edit specifiers are inserted in the text. The text including the shading edit specifiers is stored temporarily in an external document file storage. When the text is read out of the document file storage and outputted through an output unit, the shading process is implemented for the text portion enclosed by the shading edit specifiers in the text. Even if the text portion between the shading edit specifiers is revised through a re-editting process for the text by the operator, the shading process takes place invariably for the revised text portion.

2 Claims, 8 Drawing Sheets

| 51 SHADING START ADDRESS | 52 SHADING END ADDRESS | 53 SHADING MODE CODE |
|---|---|---|
| $xxx_1$ | $xxx_2$ | 0 |
| $yyy_1$ | $yyy_2$ | 1 |
| | ⋮ | |
| | | |

FIG. 4

| SHADING START ADDRESS | SHADING END ADDRESS | SHADING MODE CODE |
|---|---|---|
| $xxx_1$ | $xxx_2$ | 0 |
| $yyy_1$ | $yyy_2$ | 1 |
| ⋮ | ⋮ | ⋮ |
|  |  |  |

XXXX #HT1XXXX #ENDHT1XXX

XXXX XX X XXXX

HT2

XXXXXXXXXXX
XXXXXX

XXXXXXXXX X

ENDHT2

XXXXXX

D

DOCUMENT PROCESSING APPARATUS HAVING SHADING PROCESS FUNCTION

BACKGROUND OF THE INVENTION

This invention relates to a document processing apparatus such as a word processor and, particularly, to a document processing apparatus with the capability of performing a shading process on text in an output document.

The conventional shading process carried out by document processors is in many cases intended for the clear appearance of text portions to be corrected during the operation in which an operator retrieves a text from the document file storage which belongs to the document processor and the operator corrects the text while confirming the correction on the output screen of the display unit. Therefore, conventionally, texts stored in the document file storage do not include information pertaining to the shading process.

Namely, conventionally, the main purpose is to have a shading process by specifying the position to be shaded through the manual operation of the operator after character strings and the like have been arranged. Then the document is printed with shading, and only the character strings are stored in a document file. Therefore, the shading position changes each time the operator has modified a character string or made a document correction in a text read out of the document storage, and in each such occasion the operator needs to re-specify the shading position in the manual operation. If the operator forgets to do this operation, shading over an unexpected character string or line of characters will result.

An example of document processing apparatus having a shading process function is disclosed in JP-A-60-229163.

SUMMARY OF THE INVENTION

This invention pertains to the above-mentioned subject matter, and its object is to provide a document processing apparatus capable of surely and easily performing the shading process for documents.

This invention resides in the document processing apparatus having a shading process function, in which, when entering a text through an input unit, it is stored in a document file storage, with shading edit specifiers being appended at the front and end of lines or a character string to be shaded, and when the shading edit specifiers are detected in the text during the output of the text through an output unit after reading out from the document file storage, the lines or character string enclosed by the shading specifiers are automatically shaded.

Since shading edit specifiers are already included in a text stored in the document file storage, no adverse affect will result when the operator reads out the text from the document file storage and makes correction for it. Namely, addition or deletion of characters by the operator in a text portion immediately preceding a character string on a line or in a block of several lines to be shaded merely causes the text portion to be shaded to move while retaining the state of shading. Even in the case when the operator has added a character to a text portion to be shaded, the added character becomes the object of shading, and thus it is not necessary for the operator to re-specify the text portion to be shaded. The same is true when the operator has deleted a character in a text portion to be shaded.

BRIEF DESCRIPTION OF THE DRAWINGS

FIG. 4 is a diagram showing an example of the shading address table shown in FIG. 3;

FIG. 5 is a diagram showing shading edit specifiers appended to a portion of a text line to be shaded;

FIG. 6 is a diagram showing shading edit specifiers appended to a block of text lines to be shaded.

DESCRIPTION OF THE PREFERRED EMBODIMENT

An embodiment of this invention will be described with reference to the drawings.

Figure 1:
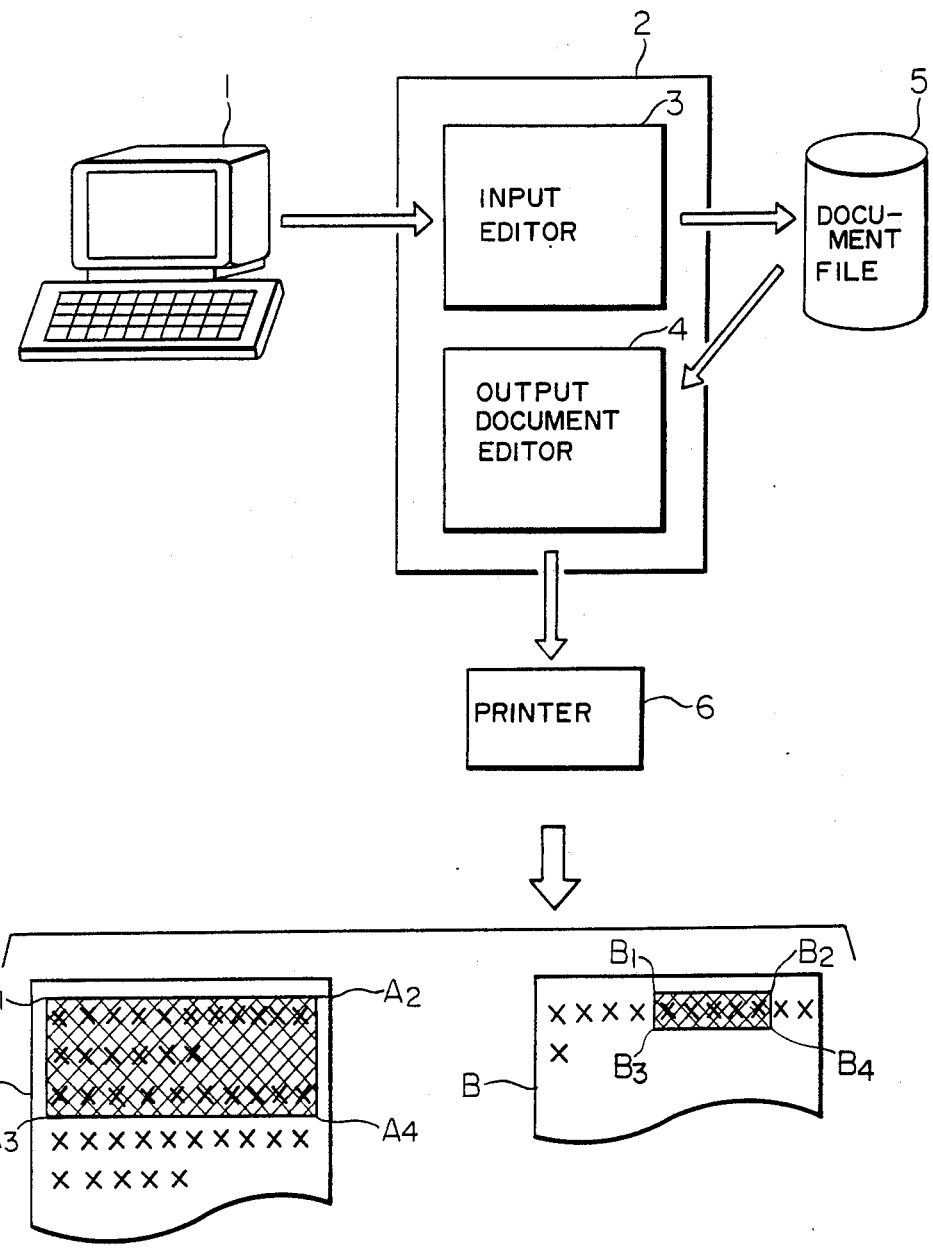
FIG. 1 is an illustration showing the overall document processing apparatus embodying the present invention.

FIG. 1 shows the system arrangement of the document processor for, particularly, accomplishing the shading process of this invention. In FIG. 1, a text of character strings to be edited is entered by the operator through an input unit 1 such as a keyboard with display, and stored in a document file storage 5 such as a hard disk unit by way of an input editor 3 in the document processor 2. At this time, the operator presses the key (not shown) for specifying the start of shading at the position immediately preceding the text portion where shading is intended, and presses the key (not shown) for specifying the end of shading at the position immediately following the text portion where shading is intended. In response to either of the above key entries, the input editor 2 inserts a shading edit specifier in the input text.

In this embodiment, there are two kinds of shading modes. One is the case in which shading is specified for a character string from one specified character to another specified character. In response to the operator's shading start command, the input editor 2 inserts a shading start edit specifier ("#HT1" in this embodiment) at the position immediately preceding the character string to be shaded, and in response to the operator's shading end command, the input editor 2 inserts a shading end edit specifier ("#ENDHT1" in this embodiment) at the position immediately following the character string to be shaded. The result of the above operations is shown in FIG. 5, in which symbol "x" represents an arbitrary character and symbol "C" indicates the text portion which will be shaded. There can be a plurality of lines between the specifiers "#HT1" and "#ENDHT1".

Another mode is the case of shading for a rectangular block including a plurality of lines. In response to the operator's shading start command, the input editor 2 inserts a shading start edit specifier ("#HT2" in this embodiment) at the position immediately preceding the first of the lines to be shaded, and in response to the operator's shading end command, the input editor 2 inserts a shading end edit specifier ("#ENDHT2" in this embodiment) at the position immediately following the last of the lines to be shaded. The result of the above operations is shown in FIG. 6, in which the text portion (rectangular block) will be shaded. In this embodiment, symbol "#" is appended to all edit specifiers including line feed, page renual, etc. The input editor stores the text including shading edit specifiers in a document file storage 5.

Figure 2:
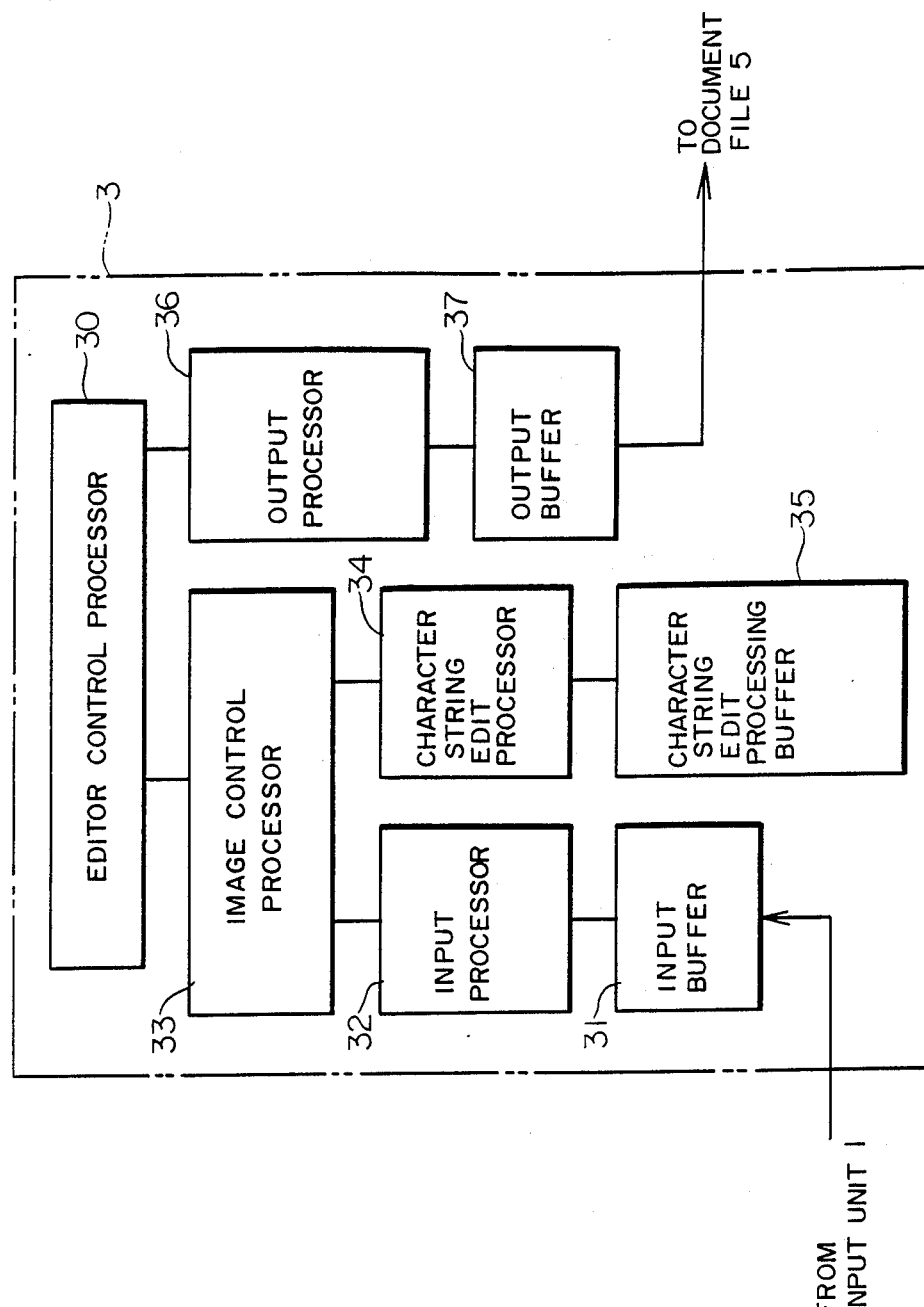
FIG. 2 is a block diagram showing in brief the input editor in the document processing apparatus shown in FIG. 1.

FIG. 2 is a block diagram showing in brief the arrangement of the input editor 2. In the figure, the text sent from the input unit 1 is entered to an input buffer 31. An editor control processor 30 produces a text including the above-mentioned shading edit specifiers from the input text stored in the input buffer 31 by using an input processor 32, image control processor 33, character string edit processor 34 and character string edit processing buffer 35, and sends the produced text to the document file storage 5 by way of an output processor 36 and output buffer 37.

Returning to FIG. 1, the text stored in the document file storage 5 is read out by an output document editor 4, and, after being processed in accordance with the edit specifiers included in the text, delivered to an output unit 6 such as a printer. In the output operation, a character string or a line block enclosed by a pair of shading edit specifiers "#HT1" and "#ENDHT1", or "#HT2" and "#ENDHT2" is outputted in graphic mode. Other text portions are outputted in text mode. Output page A in FIG. 1 is an example of print in which shading is made over a plurality of lines, while output text B is a result of shading over a character string on one line. In the output pages A and B in FIG. 1, symbol "x" represents an arbitrary character.

Figure 3:
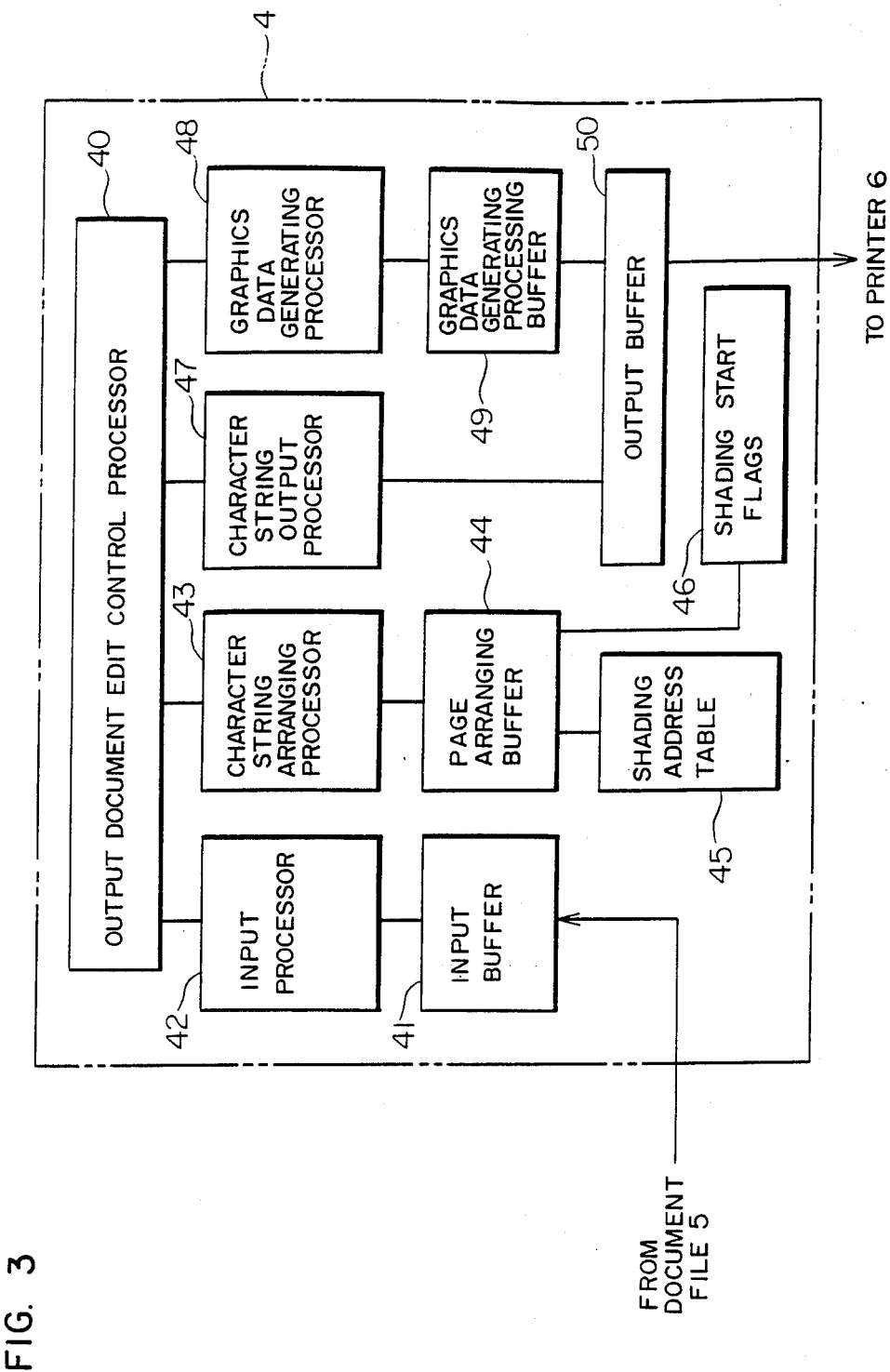
FIG. 3 is a block diagram showing in brief the output document editor in the document processing apparatus shown in FIG. 1.
Figure 7A:
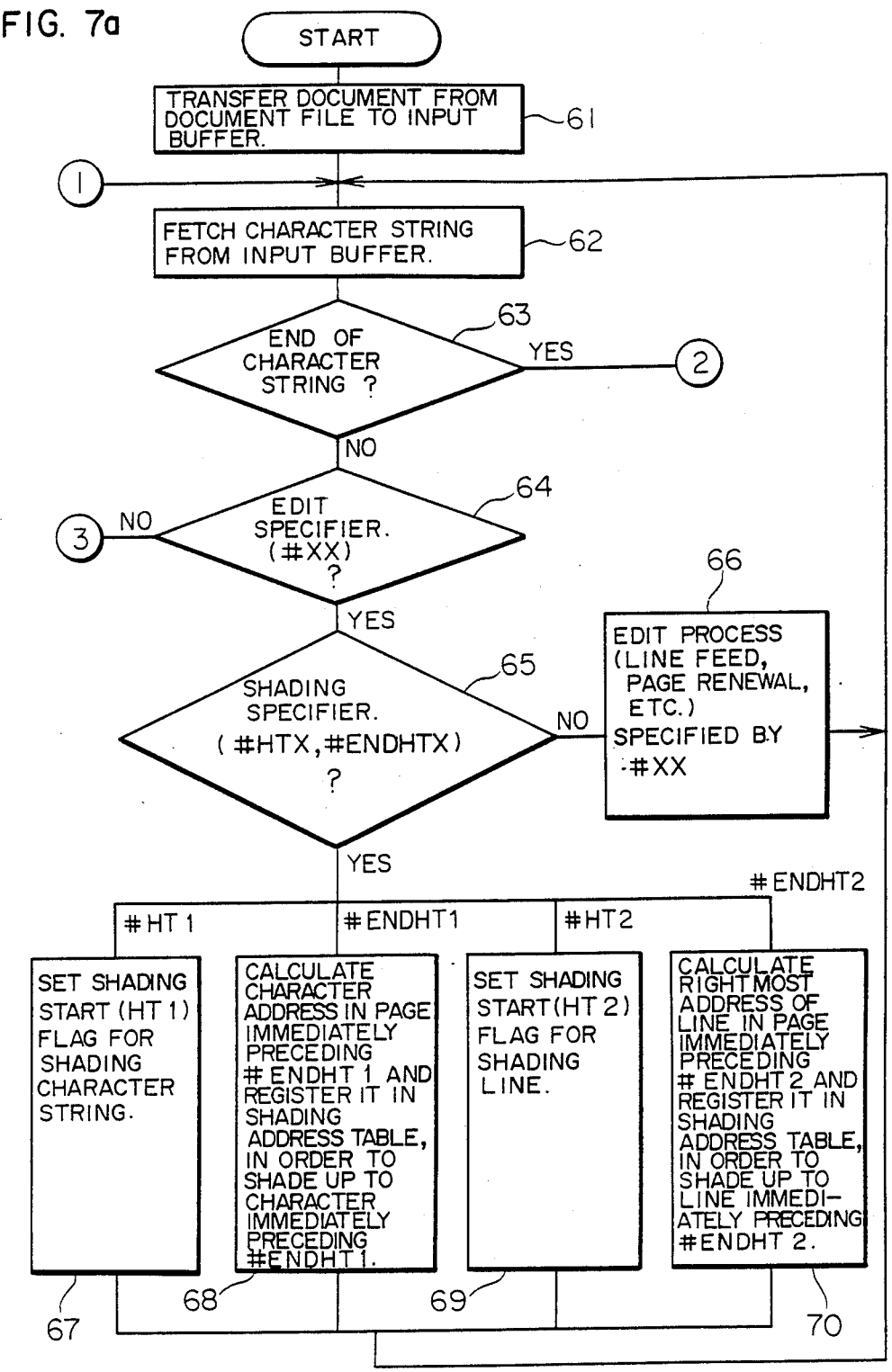
FIGS. 7a, 7b, 7c and 7d are flowcharts showing the procedures of shading process performed by the document processing apparatus shown in FIG. 1.
Figure 7B:
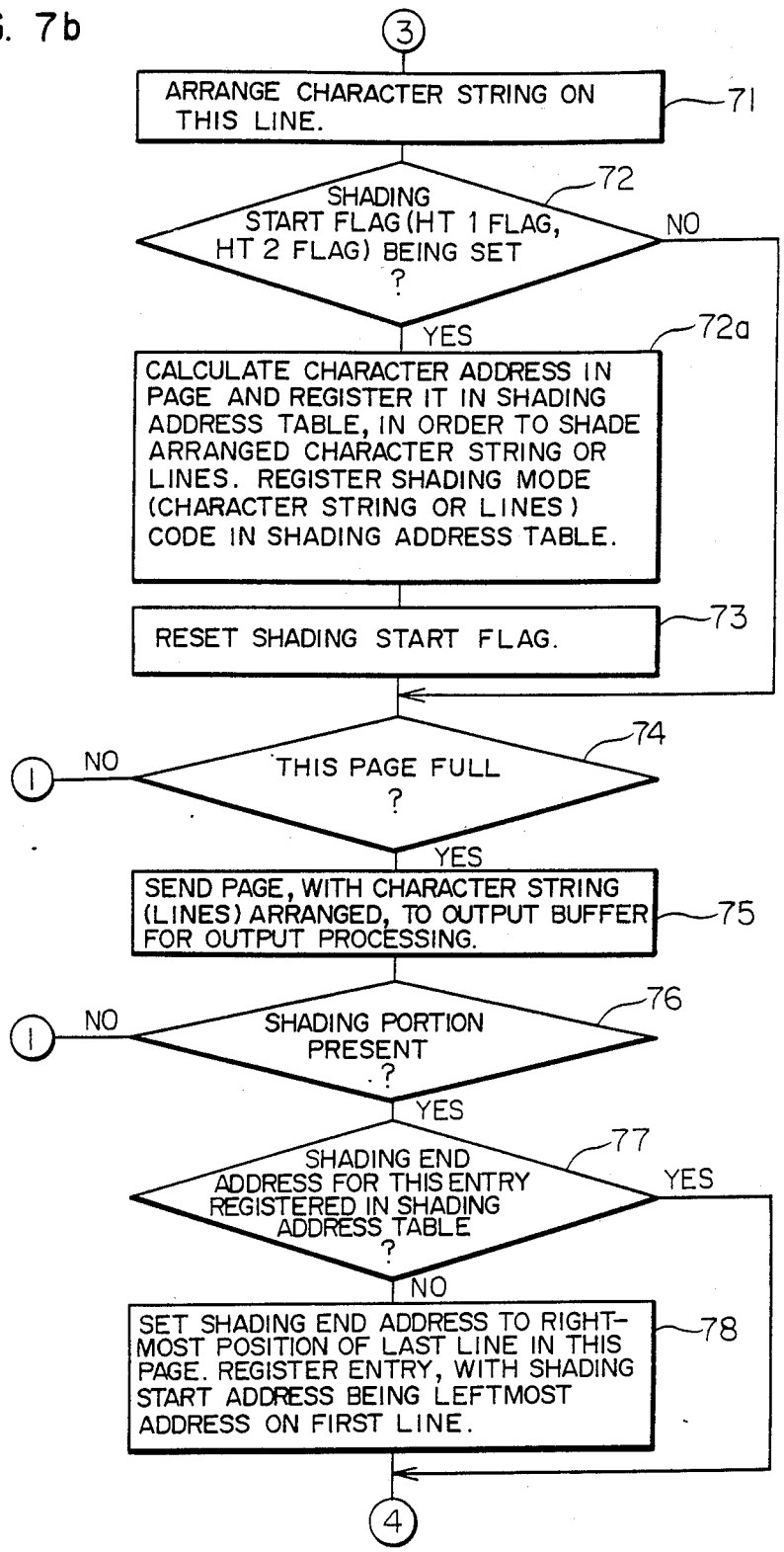
Figure 7C:
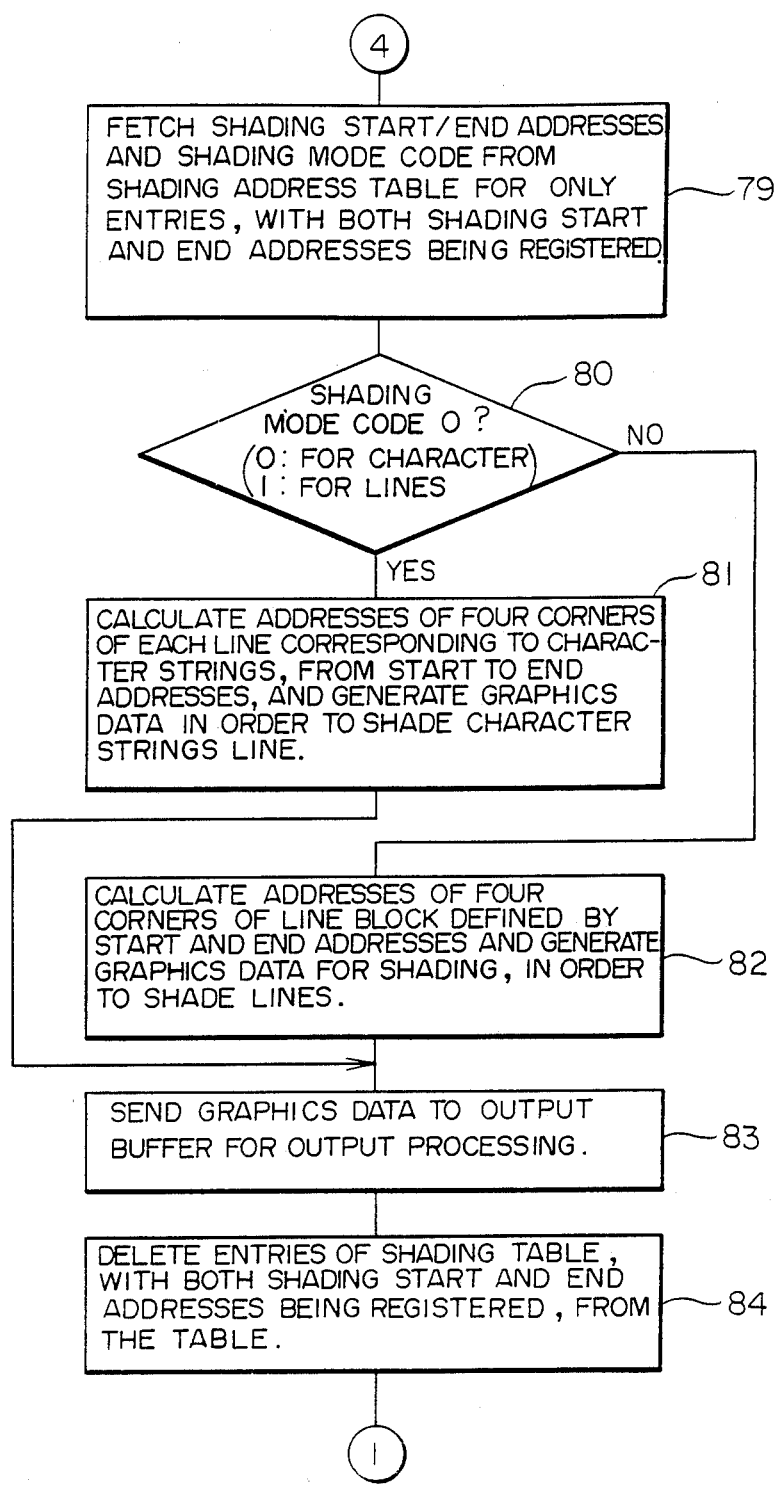
Figure 7D:
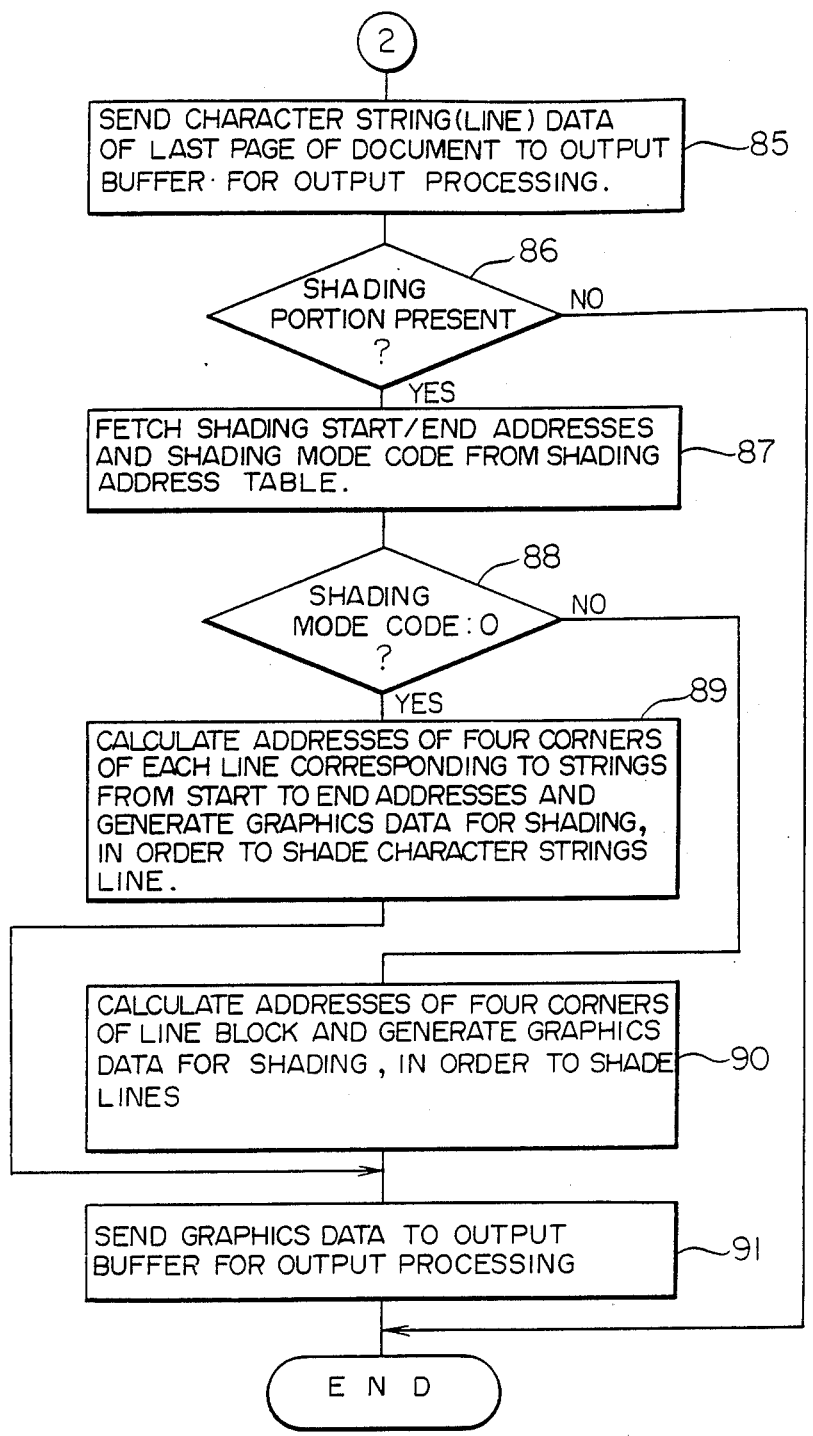

FIG. 3 is a block diagram showing in brief the arrangement of the output document editor 4. In the Figure, the text read out of the document file storage 5 is entered to an input buffer 41. An output document editting control processor 40 operates on a graphics data generating-processor 48 to process the text portion enclosed by shading edit specifiers by using an input processor 42, character string edit arranging processor 43, page arranging buffer 44, shading address table 45 and shading start flag 46, and sends the result to the output unit 6 by way of a graphics data generating-processing buffer 49 and output buffer 50.

FIGS. 7a–7d are flowcharts showing the processing procedures implemented by a document editting program for accomplishing the shading function. The following describes the program execution.

Initially, the output document editor 4 reads out a text from the document file storage 5 into the input buffer 41 (step 61). A heading character (character string) of the text is extracted (step 62). If, at this time, no character is left in the document file storage 5, the control sequence proceeds to the process for the last text page, shown in FIG. 7d, and its steps 85–91 are executed.

If the input character is "#" (step 64), it is recognized to be an edit specifier, and the subsequent character string is examined (step 65). In case an edit specifier other than the shading edit specifiers (#HT1, #HT2, #ENDHT1, #ENDHT2) is detected, a corresponding process (line feed, page renewal, etc.) will take place (step 66). The details of such processes, which do not directly relate to this invention, are not explained here.

In case a shading start edit specifier (#HT1 or #HT2) has been detected as a shading edit specifier, the corresponding shading start flag among the flags shown by 46 in FIG. 3 is set (step 67 or step 69). In case of shading end edit specifier #ENDHT1 (step 68), where a portion up to the character immediately preceding the specifier is to be shaded, the address in the page of the preceding character is calculated and registered in a shading address table in FIG. 4 (step 68). The shading address table 45 consists of a shading start address field 51, shading end address field 52 and shading mode code field 53.

In case of shading end edit specifier #ENDHT2, where lines up to the line immediately preceding the specifier is to be shaded, the address of the rightmost character of the preceding line is calculated and registered in the shading address table (step 68).

If the input character is not "#" (step 64), it is placed on the pertinent line in the page memory. (Refer to steps 71 through 84 in FIGS. 7b and 7c) After the input character has been arranged (step 71), the shading start flag is tested (step 72). If the flag is found set, indicating the start of shading at this character or line, the address in the page of the character or line is registered as a shading start address in the shading address table. At the same time, the shading mode code (specified for each character string or line) is registered in the shading address table (step 72a). If the page has become full by the arrangement of this character (step 74), character strings (lines) this page are sent to the output buffer, and the output process takes place (step 75).

Following the output process for this page, the shading address table is checked for the presence of portions to be shaded within the page (step 76). If no shading portion is found present, a character for the arrangement of a new page is taken out of the input buffer (step 62). If a portion to be shaded is present (step 76), the shading address table is checked as to whether shading is specified across pages (step 77). The rightmost address of the last line in the page is registered as the shading end address for the entry without registration of the shading end address. At the same time, the entry, with the shading start address being the leftmost address of the first line, is registered additionally so that the process of shading across pages is cancelled (step 78).

Subsequently, the shading start and end addresses and the shading mode code are fetched from the top of the shading address table (step 80). It is assumed here that entries that are rendered by the shading process are those for which both the shading start and end addresses have been registered (FIG. 4). In the case of a shading mode specified for character strings, addresses of four corners of lines made up of character strings in the range from the starting address to the ending address ($B_1$, $B_2$, $B_3$ and $B_4$ in FIG. 1) are calculated, and graphics data is produced (step 82). In case of mode specification for lines, addresses of four corners of the rectangle for lines, addresses of four corners of the rectangle defined by the starting address and ending address ($A_1$, $A_2$, $A_3$ and $A_4$ in FIG. 1) are calculated, and graphics data is produced.

The graphics data produced for the character string or lines in sent to the output buffer, and the shading output process takes place (step 83). Upon completion of the shading process, entries with both the shading start and end addresses being registered are deleted in the shading table so that the shading table is initialized, thereby preparing for the process of the next page (step 84). The last page of the document is processed in the same way as described above (steps 85–91).

According to the embodiment of this invention, as described above, specification of shading for a character string or lines does not affect the arrangement of the character string or lines, and therefore it is useful for providing a shading in revising instruction manuals and the like.

I claim:

1. A document processing apparatus having a shading process function comprising:

an input editor for editing a text entered through an input unit, said input editor operating to insert a first specifier indicative of a shading process start and a second edit specifier indicative of a shading process end in said entered text in response to a shading process start command and shading process end command, respectively, from said input unit, and thereafter storing said text in a document file storage; and an output document editor connected to said document file storage and an output unit, said output document editor receiving said text from said storage, implementing a shading process for a text portion enclosed by said first and second edit specifiers in said text, and delivering said text to said output unit, and said output document editor implementing the shading process for a character when the character is inserted within said text portion after the shading process of said text portion;

wherein said output document editor generates positional addresses for specifying a shading area in an output page produced by said output unit, in accordance with said first and second edit specifiers, and stores said addresses in a shading address table.

2. A document processing apparatus having a shading process function comprising:

editing means connected to said input unit, said editing means including;

an input editor for the text entered through said input unit, said editing means including;

an input editor for editing the text entered through said input unit, said input editor operating to insert a first edit specifier indicative of shading process start and a second edit specifier indicative of shading process end in said entered text in response to a shading process start command and shading process end command, respectively, from said input unit, and thereafter storing said text in a document file storage;

an output document editor connected to said document file storage, said output document editor receiving said text from said storage and implementing a shading process for a text portion enclosed by said first and second edit specifiers in said text, and said output document editor implementing the shading process for a character when the character is inserted within said text portion after the shading process of said text portion; and an output unit connected to said output document editor and for receiving the text including a shading process portion and outputting said shading process portion in a graphic mode and other portion in a text mode;

wherein said output document editor generates positional addresses for specifying a shading area in an output page produced by said output unit, in accordance with said first and second edit specifiers, and stores said addresses in a shading address table.

* * * * *